United States Patent
Dower et al.

(10) Patent No.: US 12,306,952 B2
(45) Date of Patent: May 20, 2025

(54) COMPONENT ACCESS TO ROM-STORED FIRMWARE CODE OVER FIRMWARE CONTROLLER EXPOSED VIRTUAL ROM LINK

(71) Applicant: Hewlett-Packard Development Company, L.P., Spring, TX (US)

(72) Inventors: Glen Douglas Dower, Fort Collins, CO (US); Peter Seiler, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 340 days.

(21) Appl. No.: 17/793,664

(22) PCT Filed: Feb. 12, 2020

(86) PCT No.: PCT/US2020/017903
§ 371 (c)(1),
(2) Date: Jul. 19, 2022

(87) PCT Pub. No.: WO2021/162690
PCT Pub. Date: Aug. 19, 2021

(65) Prior Publication Data
US 2023/0049419 A1 Feb. 16, 2023

(51) Int. Cl.
*G06F 21/57* (2013.01)
(52) U.S. Cl.
CPC ......... *G06F 21/575* (2013.01); *G06F 21/572* (2013.01); *G06F 2221/033* (2013.01)

(58) Field of Classification Search
CPC ................ G06F 21/575; G06F 21/572; G06F 2221/033; G06F 9/4401; G06F 21/44; H04N 1/60
USPC .......................................................... 726/22
See application file for complete search history.

(56) References Cited

U.S. PATENT DOCUMENTS

| | | | |
|---|---|---|---|
| 7,603,562 B2 * | 10/2009 | Flynn | G06F 21/572 713/180 |
| 7,774,596 B2 | 8/2010 | Flynn | |
| 9,189,631 B2 * | 11/2015 | Liu | G06F 21/572 |
| 9,419,897 B2 * | 8/2016 | Cherian | H04L 49/354 |
| 10,282,185 B2 * | 5/2019 | Leonelli | H04L 67/34 |
| 12,008,359 B2 * | 6/2024 | Jayakumar | G06F 21/572 |
| 2009/0327738 A1 * | 12/2009 | Flynn | G06F 12/1408 713/1 |
| 2011/0296408 A1 * | 12/2011 | Lo | G06F 8/65 718/1 |
| 2014/0101424 A1 * | 4/2014 | Krishnamurthy | G06F 9/4401 713/2 |
| 2014/0379923 A1 * | 12/2014 | Oberg | G06F 21/575 709/226 |
| 2016/0293274 A1 | 10/2016 | Schuh et al. | |
| 2017/0039053 A1 * | 2/2017 | Siluvainathan | G06F 9/4401 |

(Continued)

*Primary Examiner* — Catherine Thiaw
*Assistant Examiner* — Nega Woldemariam
(74) *Attorney, Agent, or Firm* — Knobbe, Martens, Olson & Bear, LLP

(57) ABSTRACT

A read-only memory (ROM) stores firmware code for a hardware component. A firmware controller is directly physically connected to the hardware component and to the ROM. The firmware controller exposes a virtual ROM link to the hardware component. The hardware component accesses the firmware code over the virtual ROM link exposed by the firmware controller.

17 Claims, 3 Drawing Sheets

(56) References Cited

U.S. PATENT DOCUMENTS

| | | | |
|---|---|---|---|
| 2019/0253264 A1 | 8/2019 | Singaravelu et al. | |
| 2021/0248238 A1* | 8/2021 | Chen | G06F 21/572 |
| 2021/0312056 A1* | 10/2021 | Kloth | G06F 3/0679 |
| 2021/0326431 A1* | 10/2021 | Zhang | G06F 21/575 |

* cited by examiner

COMPONENT ACCESS TO ROM-STORED FIRMWARE CODE OVER FIRMWARE CONTROLLER EXPOSED VIRTUAL ROM LINK

BACKGROUND

Computing devices like computers can include firmware, such as a basic input/output system (BIOS), a unified extensible firmware interface (UEFI), and so on. At power-on startup of a computing device, the firmware performs hardware initialization and testing and then loads and passes control to a boot loader. The boot loader in turn initializes and starts an operating system of the computing device, which governs subsequent running of software on the device.

DETAILED DESCRIPTION

Figure 1:
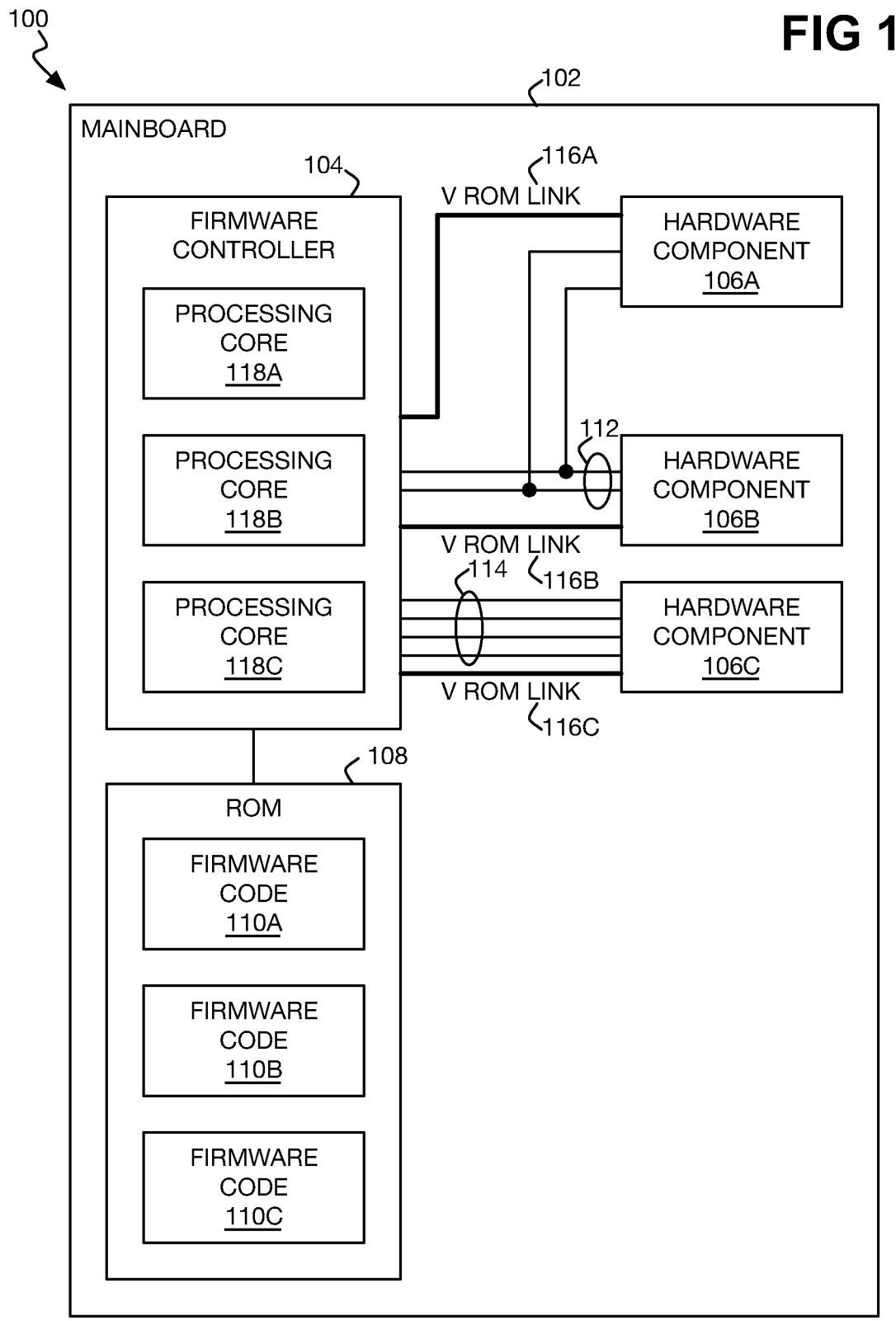
FIG. 1 is a diagram of an example computing device having a firmware controller that exposes virtual read-only memory (ROM) links to hardware components for access to ROM-stored firmware code.

The firmware of a computer or other computing device is the first software run at power-on startup to initialize hardware before loading and passing control to a boot loader that initializes and starts the operating system of the device. In addition, certain hardware components of the computing device may have their own firmware, apart from the basic input/output system (BIOS), unified extensible firmware interface (UEFI), or other primary firmware of the device. These hardware components may be separate integrated circuits (ICs) on the computing device's mainboard, including universal serial bus (USB) controllers, local-area network (LAN) on mainboard (LOM) controllers, and mass storage device controllers such as serial advanced technology (AT) attachment (SATA) and peripheral component interconnect express (PCIe) controllers.

The firmware of such hardware components is often stored on respective read-only memories (ROMs) of the components. The ROM of a hardware component may be a separate IC directly physically connected to the component, or may be integrated within the component itself. At power-on startup of the computing device, the hardware components may automatically load and begin executing their firmware from their respective ROMs. Such loading and execution is independent of and separate from the loading and execution of the primary firmware of the computing device, such as the BIOS or UEFI of the device.

Modern computing device primary firmware can perform an authentication process known as secure boot authentication. Secure boot authentication verifies the integrity of firmware, such as the boot loader, before it is loaded and executed on a computing device. For example, the primary firmware may verify that the boot loader, as well as other firmware that the primary firmware is responsible for loading, is digitally signed by a trusted party before loading and execution. Secure boot authentication provides a first-line defense against potential malware attacks within the pre-boot environment, before the operating system of a computing device is loaded and run.

However, secure boot authentication does not currently extend to the firmware of hardware components stored in separate ROMs, unless the hardware components have the capability to perform their own secure boot authentication of their respective firmware. This is because secure boot authentication mainly occurs at the primary firmware of a computing device, which does not load or otherwise have responsibility for the firmware of hardware components stored in ROMs of the components. This situation leaves open a potential security vulnerability, in that secure boot authentication of primary firmware cannot detect malware intrusion at the firmware of individual hardware components stored in ROMs of those components, or that such firmware has otherwise been compromised.

Proposals have been introduced to extend secure boot authentication to the firmware of hardware components stored in separate ROMs. In practice this means that the hardware components, like the primary firmware of a computing device, will have to authenticate all code they intend to load and execute. Existing hardware components will have to be updated to perform such functionality. Such updating of a hardware component may, in a best-case scenario involve just a low-level recoding or minor redesign of the component, to perform the requisite secure boot authentication before loading its firmware and other software, for example.

However, hardware components can have vastly less processing capability as compared to the primary or central processors of a computing device that execute primary firmware. A hardware component may have insufficient processing capability, for instance, to perform the cryptographic functionality to achieve secure boot authentication, particularly in the context of digital signature verification. To update the existing design of a computing device to perform secure boot authentication at the hardware component level may, therefore, mean that certain hardware components have to be specified with versions that have greater processing capability. This in turn can increase computing device cost.

Techniques described herein ameliorate these and other issues. A ROM can store firmware for a number of hardware components that ordinarily would store their own firmware on respective ROMs. The hardware components may not be directly physically connected to this ROM. Rather, a single firmware controller with secure boot authentication capabilities (e.g., another IC) is directly physically connected to the ROM as well as to each hardware component and exposes respective virtual ROM links to the components over which they access their firmware. A virtual ROM link exposed to a hardware component mimics or virtualizes a direct physical connection between the component and the ROM, as if the component were so connected to the ROM. The hardware component accesses its firmware over the virtual ROM link as if the component were directly connected to the ROM—and even though the hardware component is not.

The firmware controller can perform secure boot authentication of the hardware components' firmware prior to the components being permitted access to their firmware over virtual ROM links. Even if the components themselves cannot or do not perform—or are insufficiently capable of performing—secure boot authentication, such authentication may still occur, and existing hardware components can still be used. The firmware controller—which may be separate from the BIOS, UEFI, or other primary firmware of a computing device—instead performs secure boot authentication on behalf of the components, which may even be unaware that such authentication has been or is being performed. While the controller is an extra IC or other component, because multiple ROMs can be replaced by a single ROM storing firmware for multiple hardware components, cost savings—and at least spatial savings—may still result. A firmware controller can be considered as circuitry, such processing and memory circuitry, which can store and execute executable instructions to cause a firmware control program, or firmware, to be performed.

Furthermore, the techniques described herein can be used in contexts other than secure boot authentication. Even if the firmware controller does not perform secure boot authentication, centralizing storage of firmware for multiple hardware component within a common ROM can be beneficial. Such centralization provides for a central point at which diverse hardware component firmware can be managed, for example, and also can provide for cost savings and spatial savings, as noted above. As to the latter, replacing multiple ROMs with a single ROM can open up more room on a computing device's mainboard for other components, or permit usage of a physically smaller mainboard.

FIG. 1 shows an example computing device 100, such as a computer like a desktop, laptop, or other type of computer. The computing device 100 includes a mainboard 102, which may also be referred to as a motherboard or a primary logic board of the device 100. The mainboard 102 includes a firmware controller 104 and hardware components 106A, 106B, and 106C, which may be respectively referred to as first, second, and third hardware components and that are collectively referred to as the hardware components 106, and a ROM 108. The controller 104 and the components 106 may each be implemented as a separate IC on the mainboard 102. The computing device 100 and/or the mainboard 102 can include other components besides those depicted in FIG. 1. For example, the mainboard 102 may include one or multiple central or primary processors, as well as an IC like a ROM storing the primary firmware of the device 100, such as a BIOS or UEFI, and which is separate from the firmware controller 104.

Figure 3:
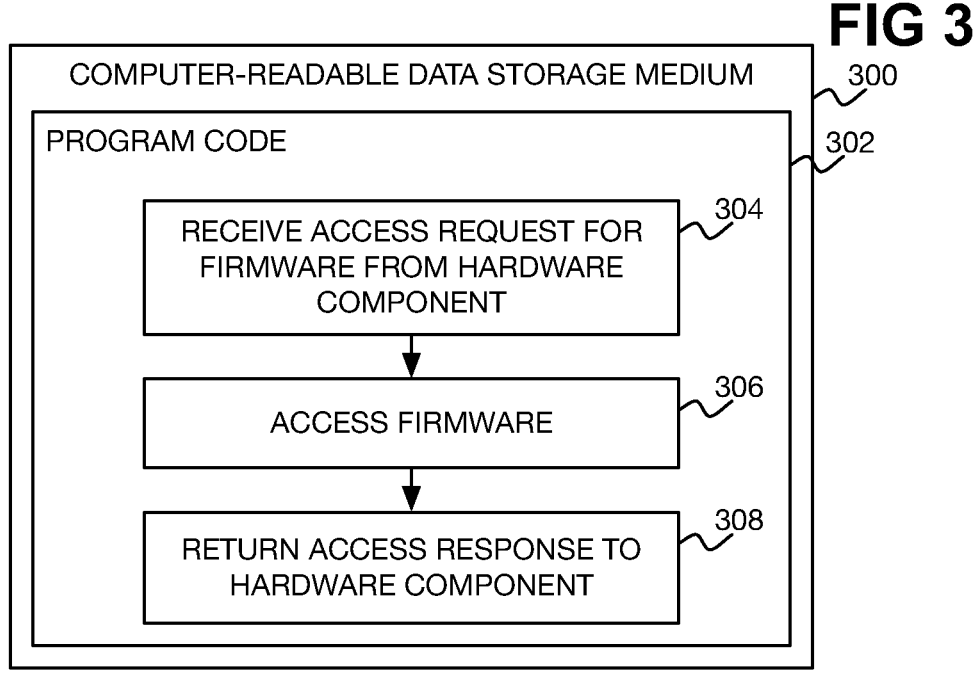
FIG. 3 is a diagram of an example computer-readable data storage medium storing program code that a firmware controller executes to expose a virtual ROM link to a hardware component for access to firmware code stored on a ROM.

In the example of FIG. 3, three hardware components 106 are depicted for example purposes, but there may be more or fewer components 106, including just one component 106. The hardware components 106 are components that ordinarily have firmware stored on their own respective ROMs. Such a hardware component 106 would ordinarily be directly physically connected to its respective ROM in the case where the ROM is implemented as an IC on the mainboard 102 separate from the component 106. In another case, such a ROM of a hardware component 106 may ordinarily be integrated within the component 106 itself. As noted above, examples of hardware components 106 include USB controllers, LOM controllers, and mass storage device controllers like SATA and PCIe controllers. In a typical computing device 100, there may be between one and under ten such hardware components 106, for example.

The ROM 108 instead stores firmware code 110A, 110B, and 110C, which may respectively be referred to as first, second, and firmware code, which are collectively referred to as the firmware code 110, and that respectively correspond to the hardware components 106A, 106B, and 106C. That is, the firmware code 110A is or includes firmware for the hardware component 106A; the code 110B is or includes firmware for the component 106B; and the code 110C is or includes firmware for the component 106C. The firmware code 110 for a hardware component 106 includes the firmware and any other code that the component 106 is to load at power-on startup of the computing device 100 and subsequently execute. The ROM 108 therefore is a ROM common to and effectively shared by the hardware components 106.

The ROM 108 is directly physically connected to the firmware controller 104, but may not be directly physically connected to the hardware component 106. Instead, a hardware component 106 accesses its respective firmware code 110 through or via the firmware controller 104. The firmware controller 104 is directly physically connected to the hardware components 106. Specifically, in the example of FIG. 1, the controller 104 is directly physically connected to the components 106A and 106B over common or shared physical lines 112, which may be considered first physical lines, and is directly physically connected to the component 106C over dedicated physical lines 114, which may be considered second physical lines. The physical lines 112 may be electrical traces on the mainboard 102, for instance, or wires. The hardware components 106A and 106B are not connected to the physical lines 114, and the hardware component 106 is not physically connected to the physical lines 112.

The physical lines 112 may be common to or shared by both the hardware components 106A and 106B in that each of the components 106A and 106B accesses its corresponding firmware code 110A or 110B through the firmware controller 104 via the same lines 112. Other hardware components 106 may also share the physical lines 112 in this manner. In the example of FIG. 1, there are two physical lines 112, but in other implementations there may be more or fewer such lines 112. The physical lines 114 are dedicated in that they directly physically connect just the hardware component 106C to the firmware controller 104, and just the component 106C accesses its firmware code 110C through the firmware controller 104 via the lines 114. In the example of FIG. 1, there are four physical lines 114, but there may be more or fewer such lines 114. Other hardware components 106 may have their own dedicated physical lines as well.

The firmware controller 104 respectively exposes virtual ROM links 116A, 116B, and 116C, collectively referred to as the virtual ROM links 116, to the hardware components 106 over the physical lines 112 and 114. Specifically, the firmware controller 104 exposes the virtual ROM link 116A, which may be considered a first virtual ROM link, to the component 106A and the virtual ROM link 116B, which may be considered a second virtual ROM link, to the component 106B over the same physical lines 112. The controller 104 exposes the virtual ROM link 116C, which may be considered a third virtual ROM link, to the hardware component 106C over the physical lines 114 dedicated to the component 106C.

Each virtual ROM link 116 mimics or virtualizes a direct physical connection between its corresponding hardware component 106 and the ROM 108 as if the component 106 in question were directly physically connected to the ROM 108. That is, each hardware component 106 accesses its corresponding firmware code 110 stored on the ROM 108 over its corresponding virtual ROM link 116 as if the component 106 were directly physically connected to the ROM 108. The firmware controller 104 responds to firmware code access requests from the hardware components 106 presented on the physical lines 112 and 114 in the manner expected by the components 106, as if the components 106 were directly physically connected to the ROM 108 over the lines 112 and 116.

For example, the hardware components 106A and 106B may each ordinarily communicate with a directly physically connected ROM via a two-wire interface protocol such as the inter-integrated circuit (I2C) protocol. Therefore, the virtual ROM links 116A and 116B each mimic or virtualize such a two-wire direct physical connection. The firmware controller 104 listens for firmware code access requests on the physical lines 112 that the hardware components 106A and 106B make in accordance with the I2C protocol, and sends back responses on the lines 112 that are also according to the I2C protocol. From each of the hardware components 106A and 106B's perspective, it is communicating directly with the ROM 108 over the physical lines 112, even though in actuality it is communicating with the firmware controller 104 over the lines 112.

In this respect, then, it is said that the firmware controller 104 exposes respective virtual ROM links 116A and 116B to the components 106A and 106B, and similarly exposes the virtual ROM link 116C to the component 106C. The hardware components 106 may be unaware that they are communicating with the firmware controller 104 and not with the ROM 108 itself. The hardware components 106 may each be unaware that the ROM 108 stores firmware code 110 for other components 106 besides itself. The hardware components 106A and 106B may further be unaware that they are sharing the physical lines 112 with one another.

The firmware controller 104 can include processing cores 118A, 118B, and 118C, which may be considered first, second, and third processing cores and that are collectively referred to as the processing cores 118. The processing cores 118 may correspond to the hardware components 106. For example, the processing core 118A may expose and be responsible for communication over the virtual ROM link 116A to the hardware component 106A. Similarly, the core 118B may expose and be responsible for communication over the virtual ROM link 116B to the component 106B, and the core 118C may expose and be responsible for communication over the virtual ROM link 116C to the component 106C. Having a separate processing core 118 for each virtual ROM link 116 can ensure that the firmware controller 104 is able to sufficiently manage simultaneous access to the firmware code 110 stored on the ROM 108 by more than one hardware component 106C. The cores 118 may all attempt to access the ROM 108, which may be managed to not exceed the read capabilities of the firmware controller 104 reading from the ROM 108.

It is noted in this respect that because the hardware components 106A and 106B share the same physical lines 112 directly connecting them to the firmware controller 104, provisions may have to be put into place to avoid any undue contention on the lines 112. For instance, it may be expected that most if not the vast majority of access by the components 106 to their respective firmware code 110 stored on the ROM 108 occurs at startup. Therefore, the firmware controller 104 may stagger starting the hardware components 106A and 106B in particular, so that concurrent firmware access requests are less likely to occur on the physical lines 112, as is now described. It is also noted, that in examples where shared buses are used, communication protocols such as I2C and serial peripheral interface (SPI) have mechanisms to prevent multiple master devices from using the bus at the same time, through an arbitration process or chip select mechanism.

Figure 2:
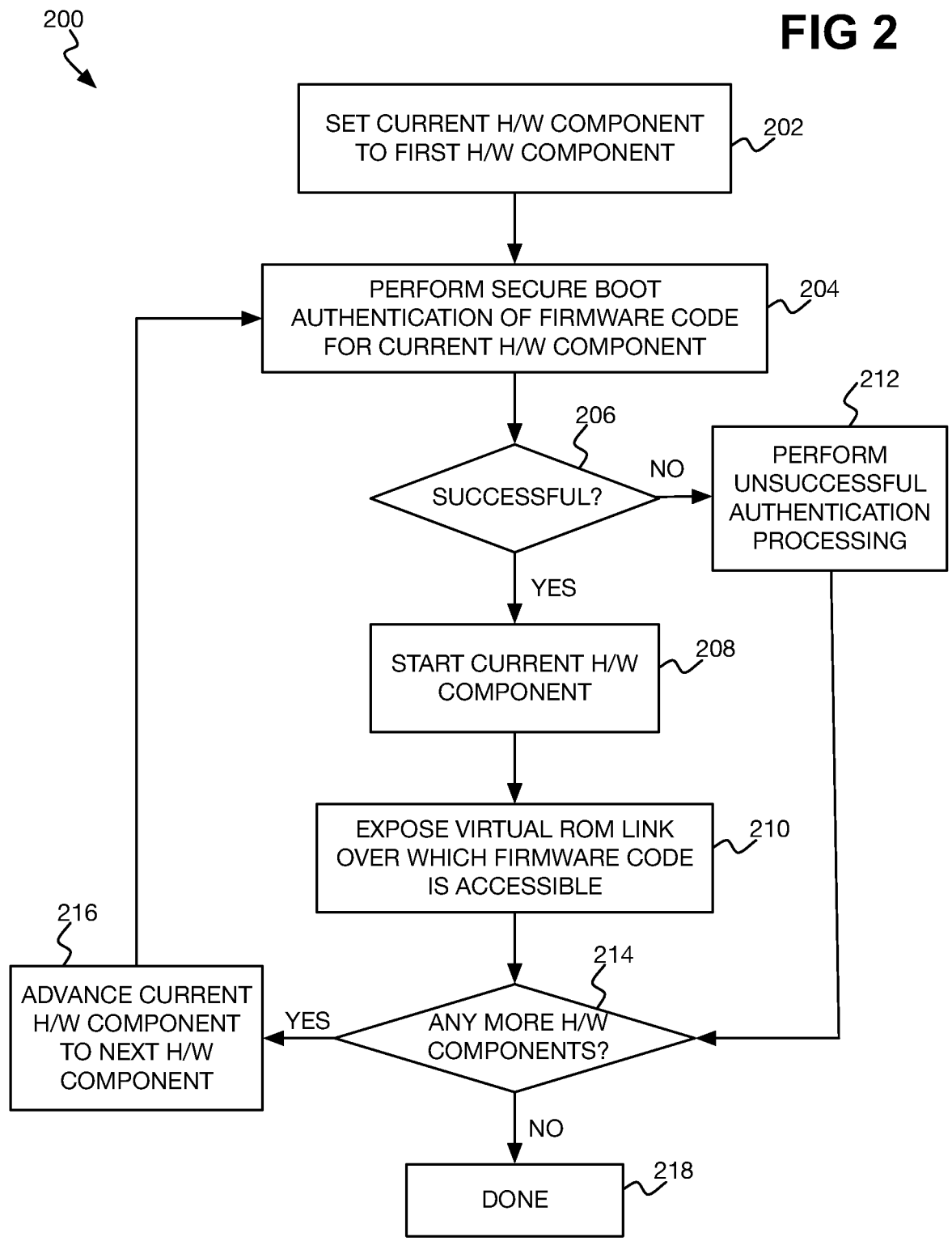
FIG. 2 is a flowchart of an example method by which a firmware controller can perform secure boot authentication of firmware code stored on a ROM prior to exposing a virtual ROM link to a hardware component for access to the firmware code.

FIG. 2 shows an example method 200 by which the firmware controller 104 can perform secure boot authentication of the firmware code 110 prior to exposing virtual ROM links 116 to the hardware components 106 for access to the code 110. The method 200 may be implemented as program code stored on a non-transitory computer-readable data storage medium and executed by the firmware controller 104. Such an implementation encompasses integral programming of the controller 104 to perform the functionality of the method 200, as is the case in which the firmware controller 104 is an application-specific IC (ASIC), for instance.

The firmware controller 104 sets a current hardware component to a first hardware component 106 of the computing device 100 (202). The firmware controller 104 may be aware by virtue of parameters or other data programmed in the controller 104, for instance, of the number of hardware components 106 present on the mainboard 102. The firmware controller 104 therefore sets a pointer—i.e., the current hardware component—to the first such hardware component 106, which may be the hardware component 106A.

The firmware controller 104 performs secure boot authentication of the firmware code 110 for the current hardware component stored on the ROM 108 to which the controller 104 is directly physically connected (204). Such secure boot authentication can include verifying that each file of the firmware code 110 has been signed with a digital signature for a trusted entity and/or has not been signed with a digital signature for any specified untrusted entity. The secure boot authentication that the firmware controller 104 performs with respect to the firmware code 110 for the current hardware component can be the same type of secure boot authentication that a primary firmware of the computing device 100, such as a BIOS or UEFI, performs with respect to a boot loader and other code.

If secure boot authentication is successful (206), then the firmware controller 104 starts the current hardware component (208). The method 200 is thus performed at power-on startup of the computing device 100, with the firmware controller 104 controlling starting of the hardware components 106. Until the firmware controller 104 starts a hardware component 106, the component 106 may remain in an unpowered state, or in a reset state in which it is powered, and therefore unable to perform processing like accessing or executing code such as its firmware code 110.

Once the current hardware component has been started, the firmware controller 104 exposes a virtual ROM link 116 to the component over which the hardware component can access its now secure boot-authenticated firmware code 110 (210). A particular manner by which the virtual ROM link 116 can in effect be exposed is described later in the detailed description. If the computing device 100 includes other hardware components 106 for which their firmware code 110 have not yet been secure boot-authenticated (214), the firmware controller 104 advances the current hardware component to the next such component 106 (216), and repeats the method 200 for this hardware component 106 at part 204.

Because just one hardware component 106 is started each time part 208 is performed, contention on shared physical lines 112 over which virtual ROM links 116 are exposed to multiple hardware components 106 is less likely to occur. Similarly, the likelihood that the firmware controller 104 will have to respond to concurrent firmware code access by multiple hardware components 106 over the virtual ROM links 116 is lower, and the controller 104 is more likely to be able to keep up with the processing demands of arbitrating such access. In this respect, the firmware controller 104 may not advance to the next hardware component 106 in part 216 for a specified length of time, or until the current hardware component has finished initially loading its firmware code 108 over the corresponding exposed virtual ROM link 116.

It is noted that secure boot authentication in part 204 may be unsuccessful. In such instance, the firmware controller 104 may perform what is referred to as unsuccessful authentication processing (212). For example, the firmware controller 104 may simply not start the current hardware component and proceed to part 214. As another example, the firmware controller 104 may notify the primary firmware of the computing device 100, which may responsively notify the user of the device 100 that secure boot authentication was unsuccessful and prevent the operating system of the device 100 from loading. In one implementation, the computing device 100 may be programmed to boot the operating system with the individual hardware component 106 that failed kept in an unstarted state, which therefore will be unavailable to the user. In another example, if the secure boot authentication fails for a hardware component 106, there may exist a protected copy of the firmware for that device, which can be loaded to return the hardware component 106 to a default state.

The method 200 that has been described provides for staggered starting of the hardware components 106 as the firmware controller 104 performs secure boot authentication of their respective firmware code 110 stored on the ROM 108. For each hardware component 106, the firmware controller 104 controls starting of the component 106 so that the hardware component 106 remains powered off (or powered but in a reset state) until the controller 104 has successfully performed secure boot authentication of its firmware code 110. Each hardware component 106 is thus not permitted to access its firmware code 110 until secure boot authentication has been successfully performed.

The staggered starting of the hardware components 106 in FIG. 2 can also be performed without performing secure boot authentication. The firmware controller 104 may start each hardware component 106 separately. When a hardware component 106 is started, the firmware controller 104 may expose a corresponding virtual ROM link 116 to the component 106 without first performing secure boot authentication. The firmware controller 104 may wait a specified length of time before starting the next hardware component 106 and exposing its virtual ROM link 116, or wait until the current hardware component 106 has finished initially loading its firmware code 108 over the corresponding virtual ROM link 116 that has been exposed.

FIG. 3 shows an example non-transitory computer-readable data storage medium 300 storing program code 302 executable by the firmware controller 104 to expose a virtual ROM link 116 to a hardware component 106 over the physical lines 112 or 114 directly connecting the component 106 to the controller 104. The program code 302 may be executed to implement part 210 of FIG. 2, for instance. That is, execution of the program code 302 exposes a virtual ROM link 116 to the hardware component.

The firmware controller 104 receives an access request from the hardware component 106 for the firmware code 110 of the component 106 stored on the ROM 108 (304). The hardware component 106 provides the access request, such that the firmware controller 104 correspondingly receives the access request, in accordance with the protocol that governs such communication if the component 106 were directly physically connected to the ROM 108. That is, the hardware component 106 makes the access request as if it were directly physically connected to the ROM 108, and the hardware component 106 may be unaware that it is the firmware controller 104, and not a ROM, which receives the request.

The firmware controller 104 accesses the firmware code 110 for the component 106 stored on the ROM 108 in accordance with the received access request (304). Because the firmware controller 104 arbitrates access to the firmware code 110 by the hardware components 106, the controller 104 can ensure that each component 106 can access just its own code 110, and not the firmware code 110 for any other hardware component 106. Indeed, the hardware components 106 may be unaware that there is firmware code 110 for other hardware components 106.

The firmware controller 104 may have to translate the access request in order to retrieve the requested firmware code 110 from the ROM 108. For example, because the ROM 108 stores firmware code 110 for multiple hardware components 106, the physical address space of the ROM 108 at which the firmware code 110 is stored may differ from the address space by which the hardware component 106 references the firmware code 110. Therefore, the firmware controller 104 may perform address translation when reading or writing the requested firmware code 110 on the ROM 108.

Similarly, the protocol by which the firmware controller 104 communicates with the ROM 108 may differ from the protocol by which the hardware component 106 in question sent the access request received in part 304. Therefore, the firmware controller 104 may have to translate the received access request to the protocol by which the controller 104 can perform the requested read or write on the ROM 108. The firmware controller 104 may perform translation other than or in addition to address translation and protocol translation as well.

The firmware controller 104 returns an access response to the hardware component 106 from which the controller 104 received the access request (308). The access response may include the requested firmware code 110 in the case of a read request, for instance, or confirmation of a successful write in the case of a write request. The controller 104 provides the access response according to the protocol in accordance with which the controller 104 received the access request from the hardware component 106. That is, the firmware controller 104 sends the access response in accordance with the protocol that governs such communication if the ROM 108 were directly physically connected to the hardware component 106. The hardware component 106 may be unaware that it is communicating with the controller 104 and not with a ROM.

Figure 4:
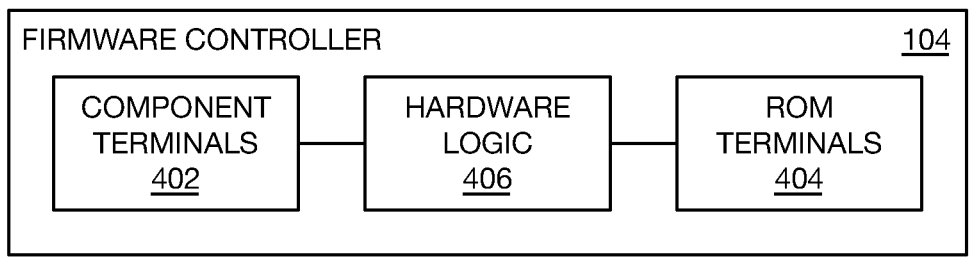
FIG. 4 is a diagram of an example firmware controller.

FIG. 4 shows a block diagram of an example implementation of the firmware controller 104. The controller 104 includes component terminals 402, ROM terminals 404, and hardware logic 406. The hardware logic 406 can include the circuitry, such as the processing and memory circuitry, of the firmware controller 104. The component terminals 402 directly physically connect the firmware controller 104 to a hardware component 106, such via the physical lines 112 or 114 to which the component 106 is connected. The ROM terminals 404 similarly directly physically connect the controller 104 to the ROM 108 storing the firmware code 110 for the hardware component 106. The terminals 402 and 404 may be pins, for instance, that are inserted through and soldered to the mainboard 102.

The firmware controller 104 includes hardware logic 406 to expose a virtual ROM link 116 to the hardware component 106 over which the component 106 accesses its firmware code 110 stored on the ROM 108. The hardware logic 406 may be in the form of an IC like an ASIC, for instance. The hardware logic 406 can also be in the form of a processor that executes program code stored on a separate memory, including a ROM such as the ROM 108. The hardware logic 406 thus includes transistors programmatically connected to realize the exposure of the virtual ROM link 116 to the hardware component 106.

Figure 5:
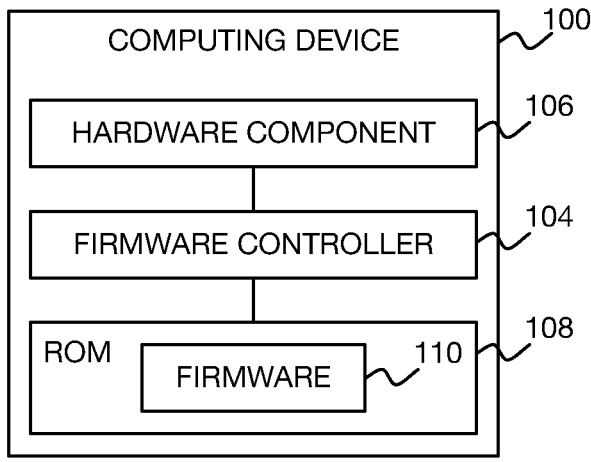
FIG. 5 is a diagram of an example computing device.

FIG. 5 shows a block diagram of an example implementation of the computing device 100. The computing device 100 includes a hardware component 106 and a ROM 108 storing firmware code 110 for the hardware component 106. The computing device 100 includes a firmware controller 104 directly physically connected to the hardware component 106 and to the ROM 108. The firmware controller 104 expose a virtual ROM link 116 to the hardware component 106 over which the hardware component 106 accesses its firmware code 110.

Example techniques have been described by which firmware for multiple hardware components of a computing device can be stored on a common or shared ROM. Rather than the hardware components directly accessing the ROM via direct physical connections, a firmware controller physically connected between the ROM and the components exposes virtual ROM links over which the components access their firmware. The firmware controller can thus perform secure boot authentication of the firmware before permitting the hardware components access to their firmware.

We claim:

1. A computing device comprising:
 a hardware component;
 a read-only memory (ROM) storing firmware code for the hardware component and second firmware code for a second hardware component; and
 a firmware controller directly physically connected to the hardware component, the second hardware component, and the ROM, the firmware controller to expose (i) a virtual ROM link to the hardware component over which the hardware component is to access the firmware code and (ii) a second virtual ROM link to the second hardware component over which the second hardware component is to access the second firmware code,
 wherein the firmware controller is to:
  perform secure boot authentication of the firmware code stored on the ROM prior to permitting the hardware component to access the firmware code over the virtual ROM link;
  perform secure boot authentication of the second firmware code stored on the ROM prior to permitting the second hardware component to access the second firmware code over the second virtual ROM link;
  control starting of the hardware component so that the hardware component remains unstarted until the firmware controller has successfully performed the secure boot authentication of the firmware code;
  control starting of the second hardware component so that the second hardware component remains unstarted until the firmware controller has successfully performed the secure boot authentication of the second firmware code; and
  stagger starting of the hardware component and the second hardware component as the firmware controller successfully performs the secure boot authentication of the firmware code and the secure boot authentication of the second firmware code.

2. The computing device of claim 1, wherein the hardware component accesses the firmware code over the virtual ROM link as if the hardware component were directly physically connected to the ROM,
 and wherein the hardware component is not directly physically connected to the ROM.

3. The computing device of claim 1, wherein the virtual ROM link mimics a direct physical connection between the hardware component and the ROM,
 and wherein the hardware component is not directly physically connected to the ROM.

4. The computing device of claim 1, further comprising a plurality of physical lines between the firmware controller and the hardware component and the second hardware component and shared by the hardware component and the second hardware component,
 wherein the firmware controller exposes the virtual ROM link and the second virtual ROM link to the hardware component and the second hardware component, respectively, over the plurality of physical lines.

5. The computing device of claim 1, further comprising:
 a plurality of first physical lines between the firmware controller and the hardware component over which the firmware controller exposes the virtual ROM link; and
 a plurality of second physical lines between the firmware controller and the second hardware component over which the firmware controller exposes the second virtual ROM link,
 wherein the second hardware component is not connected to any of the plurality of first physical lines and the hardware component is not connected to any of the plurality of second physical lines.

6. The computing device of claim 1, wherein the firmware controller comprises:
 a first processing core that exposes the virtual ROM link to the hardware component; and
 a second processing core that exposes the second virtual ROM link to the second hardware component.

7. The computing device of claim 1, wherein the computing device further comprises a mainboard on which the hardware component, the ROM, and the firmware controller are disposed as respective integrated circuits (ICs).

8. A computing device comprising:
 a hardware component;
 a read-only memory (ROM) storing firmware code for the hardware component and second firmware code for a second hardware component; and
 a firmware controller directly physically connected to the hardware component, the second hardware component, and the ROM, the firmware controller to expose (i) a virtual ROM link to the hardware component over which the hardware component is to access the firmware code and (ii) a second virtual ROM link to the second hardware component over which the second hardware component is to access the second firmware code,
 wherein the firmware controller is to:
  perform secure boot authentication of the firmware code stored on the ROM prior to permitting the hardware component to access the firmware code over the virtual ROM link;

perform secure boot authentication of the second firmware code stored on the ROM prior to permitting the second hardware component to access the second firmware code over the second virtual ROM link;
restrict starting of the hardware component until the firmware controller has successfully performed the secure boot authentication of the firmware code;
restrict starting of the second hardware component until the firmware controller has successfully performed the secure boot authentication of the second firmware code; and
stagger starting of the hardware component and the second hardware component after the firmware controller successfully performs the secure boot authentication of the firmware code and the secure boot authentication of the second firmware code.

9. The computing device of claim 8, wherein the hardware component accesses the firmware code over the virtual ROM link as if the hardware component were directly physically connected to the ROM, and wherein the hardware component is not directly physically connected to the ROM.

10. The computing device of claim 8, wherein the virtual ROM link mimics a direct physical connection between the hardware component and the ROM, and wherein the hardware component is not directly physically connected to the ROM.

11. The computing device of claim 8, wherein the firmware controller is to perform secure boot authentication of the firmware code prior to permitting the hardware component to access the firmware code over the virtual ROM link.

12. The computing device of claim 8, wherein the firmware controller is to perform secure boot authentication of the second firmware code prior to permitting the second hardware component to access the second firmware code over the second virtual ROM link.

13. A firmware controller comprising:
a plurality of component terminals to directly physically connect the firmware controller to a hardware component and a second hardware component;
a plurality of read-only memory (ROM) terminals to directly physically connect the firmware controller to a ROM storing firmware code for the hardware component and second firmware code for the second hardware component; and
hardware logic to expose (i) a virtual ROM link to the hardware component over which the hardware component is to access the firmware code and (ii) a second virtual ROM link to the second hardware component over which the second hardware component is to access the second firmware code,
wherein the firmware controller is to:
perform secure boot authentication of the firmware code stored on the ROM prior to permitting the hardware component to access the firmware code over the virtual ROM link;
perform secure boot authentication of the second firmware code stored on the ROM prior to permitting the second hardware component to access the second firmware code over the second virtual ROM link;
control starting of the hardware component so that the hardware component remains unstarted until the firmware controller has successfully performed the secure boot authentication of the firmware code;
control starting of the second hardware component so that the second hardware component remains unstarted until the firmware controller has successfully performed the secure boot authentication of the second firmware code; and
stagger starting of the hardware component and the second hardware component as the firmware controller successfully performs the secure boot authentication of the firmware code and the secure boot authentication of the second firmware code.

14. The firmware controller of claim 13, wherein the hardware component accesses the firmware code over the virtual ROM link as if the hardware component were directly physically connected to the ROM, and wherein the hardware component is not directly physically connected to the ROM.

15. The firmware controller of claim 13, wherein the virtual ROM link mimics a direct physical connection between the hardware component and the ROM, and wherein the hardware component is not directly physically connected to the ROM.

16. The firmware controller of claim 13, wherein the hardware logic is to perform secure boot authentication of the firmware code prior to permitting the hardware component to access the firmware code over the virtual ROM link.

17. The firmware controller of claim 13, wherein the hardware logic is to perform secure boot authentication of the second firmware code prior to permitting the second hardware component to access the second firmware code over the second virtual ROM link.

* * * * *